A. G. WATERHOUSE.
Horse-Powers.
No. 138,108.          Patented April 22, 1873.
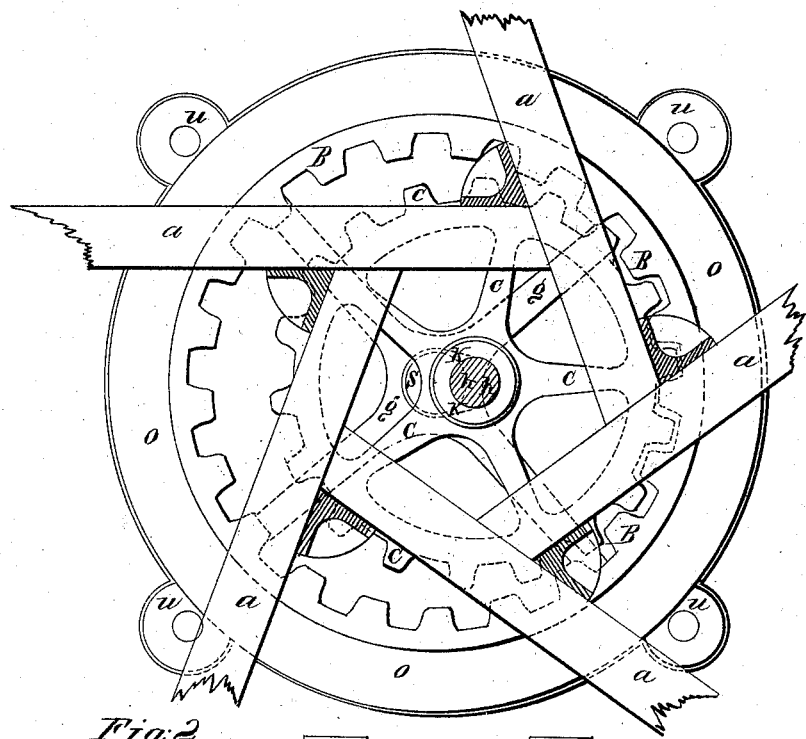
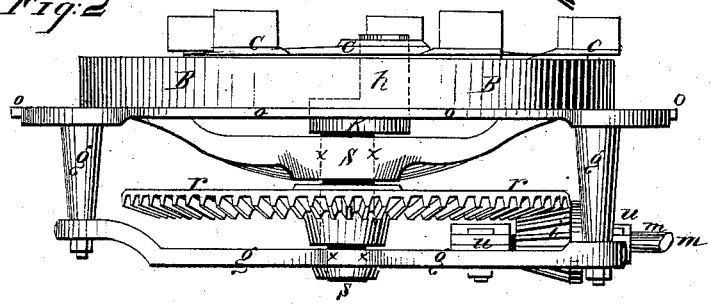
Witnesses
Henry S. Wheeler
Clark Davis
Inventor
Addison G. Waterhouse.

UNITED STATES PATENT OFFICE.

ADDISON G. WATERHOUSE, OF SAN FRANCISCO, CALIFORNIA, ASSIGNOR OF SIX-TENTHS OF HIS RIGHT TO J. S. NICHOLS AND MOSES NICHOLS, OF SAME PLACE.

IMPROVEMENT IN HORSE-POWERS.

Specification forming part of Letters Patent No. 138,108, dated April 22, 1873; application filed January 2, 1872.

*To all whom it may concern:*

Be it known that I, ADDISON GOODYEAR WATERHOUSE, of the city and county of San Francisco, State of California, have invented a new and Improved Rotary Mechanical Motion, of which the following is a full specification:

Nature and Object of the Invention.

My invention relates to that class of rotary gearing in which a spur-wheel is made to circulate within a larger wheel having internal teeth, both being on the same plane, and being connected by a crank; and my invention consists of a compact and durable arrangement of said wheels and crank, in combination with an arm or horse-sweeps, by which power may be applied to produce rotary motion, to form a device for producing a rapid motion which is applicable to horse-power machines for thrashers, and all kinds of rotary gearing in which a comparatively slow rotary motion is to produce a more rapid one.

Description of the Accompanying Drawing.

Figure 1 is a top view of a horse-power machine upon which is placed five sweeps. Fig. 2 is a side elevation of the same without sweeps.

General Description.

My invention relates to a novel system of rotary gearing, of which the following is a description, and consists in the combination of one or more arms or sweeps, A, with either wheel B or C, by which power may be applied and rotary motion produced, as shown in Fig. 1, in which the arms A are attached to wheel C, so that as the arms A are carried around the machine it will carry with it the wheel C, causing it to roll or circulate rapidly around the center of the wheel B, which in this case is rigidly attached to and made a part of the frame of the machine, (shown by Figs. 1 and 2.) Now, in this machine I place in the center of wheel B a shaft, $s$, provided with a crank, $k$, and on the crank-pin $p$ I place the wheel C, so that it will revolve freely, and said crank $k$ has such a throw that it will cause the pitch-circle of the smaller wheel C to come in contact with the pitch-circle of the larger wheel B at a point in line with the center of the crank-shaft $s$ and crank-pin $p$, so that the cogs of each wheel will mesh at said point of contact.

Now, in the machine shown in Fig. 1 there are twenty-one cogs in wheel B and eighteen cogs in wheel C, or three cogs less than in wheel B; therefore, if the crank $k$ was revolved once around it would cause wheel C to roll or circulate around in the pitch-circle of wheel B, and the eighteen cogs of C would mesh in eighteen of the cogs of B; and in order to complete the circle, or the twenty-one cogs of B, it would take three more of the eighteen cogs of C; therefore each time that the crank $k$ rotates once the wheel C revolves backward three cogs—or three-eighteenths equal one-sixth of a revolution. Now, in order to produce the reverse of this motion, or a rapid rotation of the crank-shaft $s$, I attach the sweeps A to the wheel C, by means of which power may be applied, thus forcing C to revolve, at the same time allowing it to freely circulate and carry the crank-pin $p$ around, thereby causing the crank-shaft $s$ to rotate six times during each revolution of wheel C, for each time that $s$ rotates once C rotates three cogs, and as it has eighteen cogs the three goes in eighteen six times; and in this system of gearing different proportions produce different degrees of speed, and it is also evident that if wheel C was made stationary and the crank-shaft $s$ was made or placed so as to revolve in its center, and wheel B was placed so as to revolve on the crank-pin $p$, and if the sweeps A were attached to wheel B, and B was caused to rotate, it would cause the crank $k$ to rotate once each time B revolved three cogs; and as B has twenty-one cogs the crank $k$ would rotate seven times each time B rotated once, because three multiplied by seven equals twenty-one cogs. Now, in order to cause the wheel C to revolve, and at the same time freely to circulate around with the crank-pin $p$, I attach to wheel C one or more arms, A.

In Fig. 1 of the accompanying drawing, the sweeps, of which there are five, I attach to wheel C. Wheel B is attached to and made part of the frame of the machine. Around B I place a flange, o, for the purpose of forming a way for rollers or casters to be attached, when necessary, to the sweeps A or projecting arms from the wheel C, so as to support the weight of B and A from the crank $k$, and upon the flange $o$ I place projections $n$, by which the machine may be bolted to a wooden frame. Under the wheels B and C I place a bevel-wheel, $r$, securely attached to the crank-shaft $s$, shaft $s$ being supported by bearings $x$ in the frame $g$. Bevel-wheel $r$ works in a pinion, $i$, which is attached to and revolves a tumbling-rod $m$, rod $m$ being supported by bearings $u$ in the frame $g$.

Claim.

I claim as my invention—

The combination of the wheels B and C and the crank $k$ with the arm or arms A, to be propelled in the manner and for the purposes substantially as hereinbefore set forth.

ADDISON G. WATERHOUSE.

Witnesses:
HENRY S. WHEELER,
CLARK DAVIS.